June 2, 1925.  1,540,124
F. A. HAYES
VARIABLE SPEED TRANSMISSION MECHANISM
Filed March 14, 1921  10 Sheets-Sheet 1
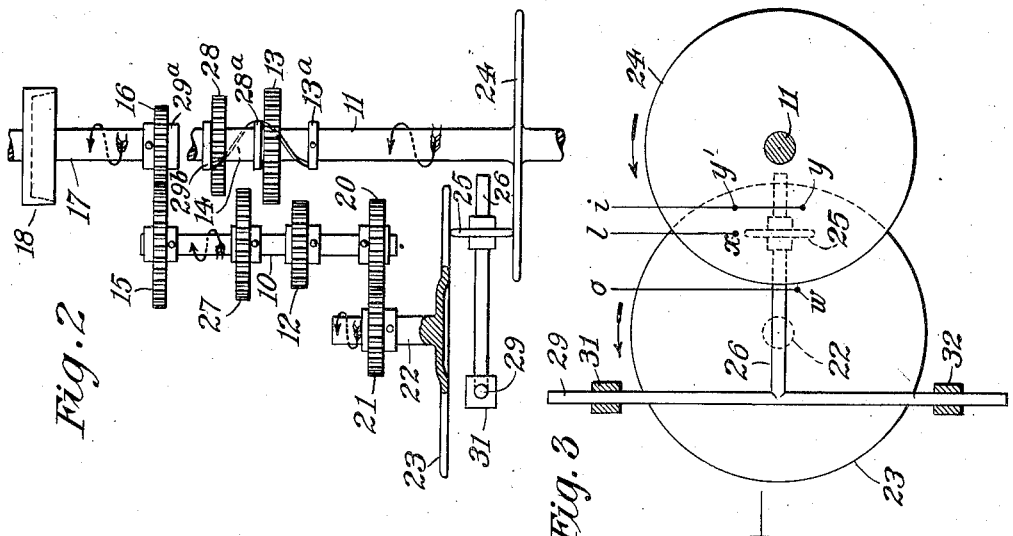
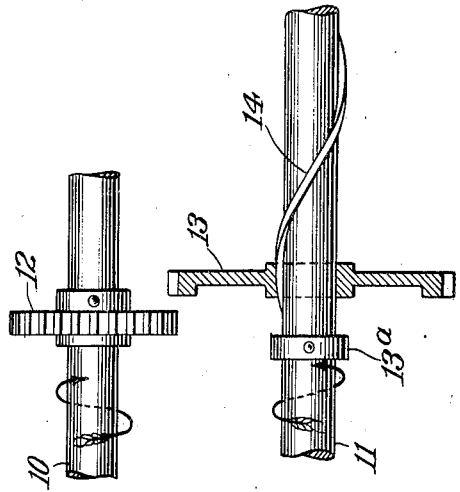
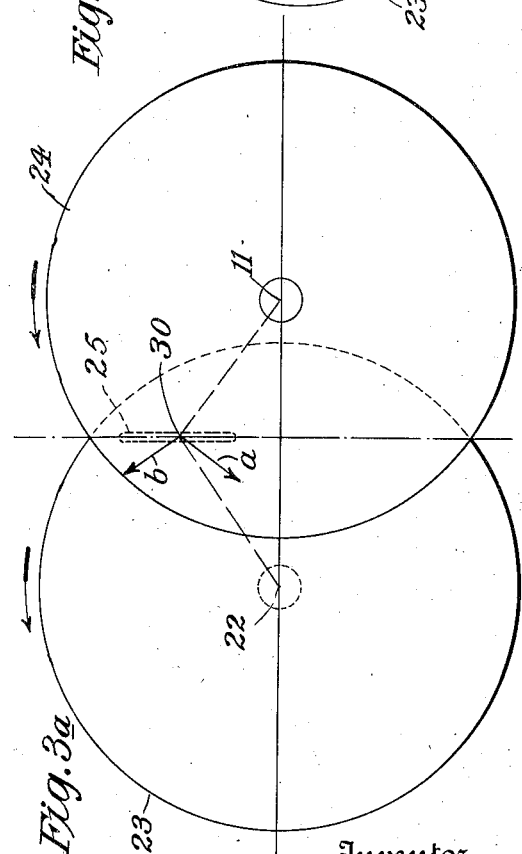
Inventor
Frank A. Hayes
By his Attorneys
Kerr, Page, Cooper & Hayward

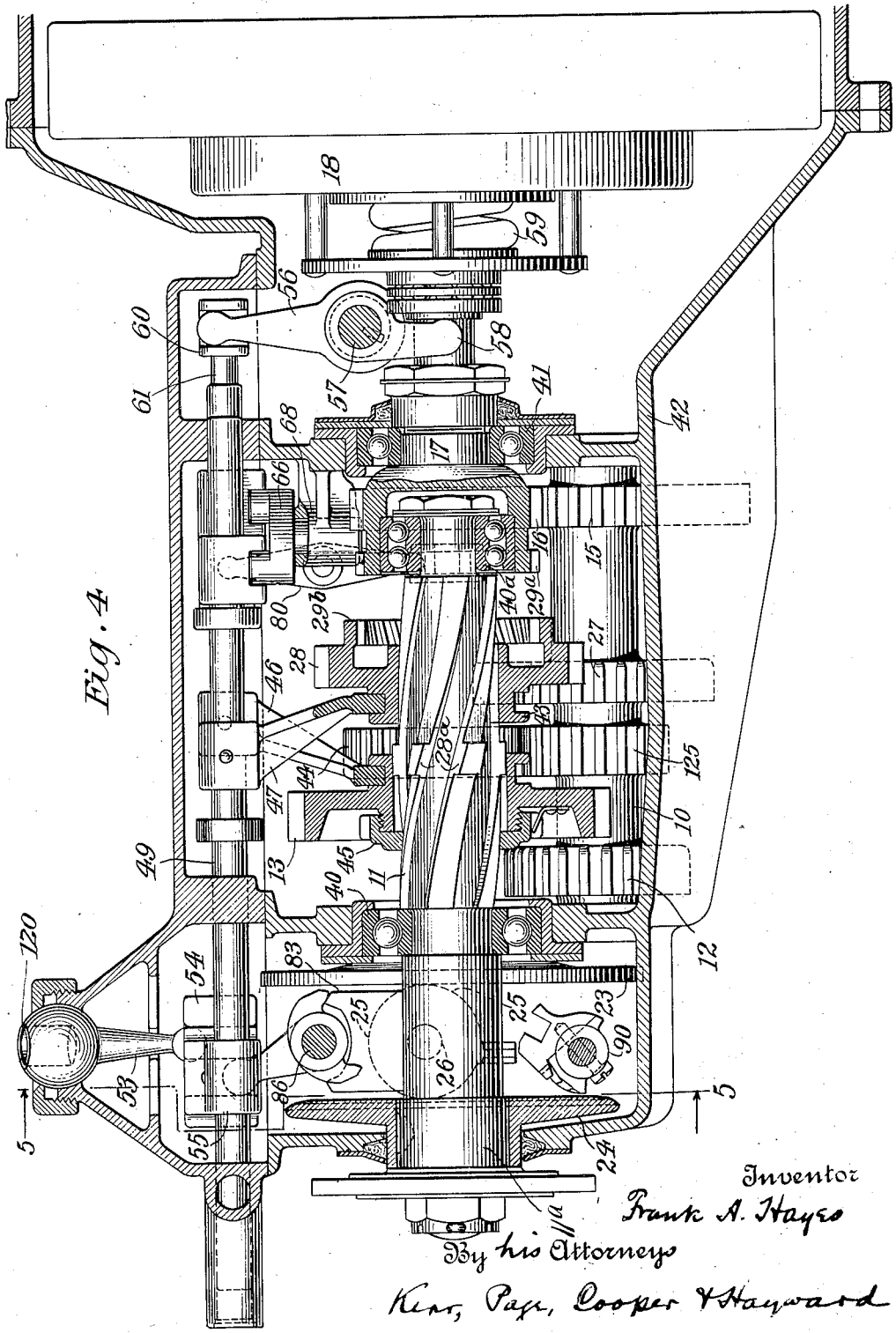

June 2, 1925.

F. A. HAYES 1,540,124

VARIABLE SPEED TRANSMISSION MECHANISM

Filed March 14, 1921    10 Sheets-Sheet 3

Inventor
Frank A. Hayes
By his Attorneys
Kerr, Page, Cooper & Hayward

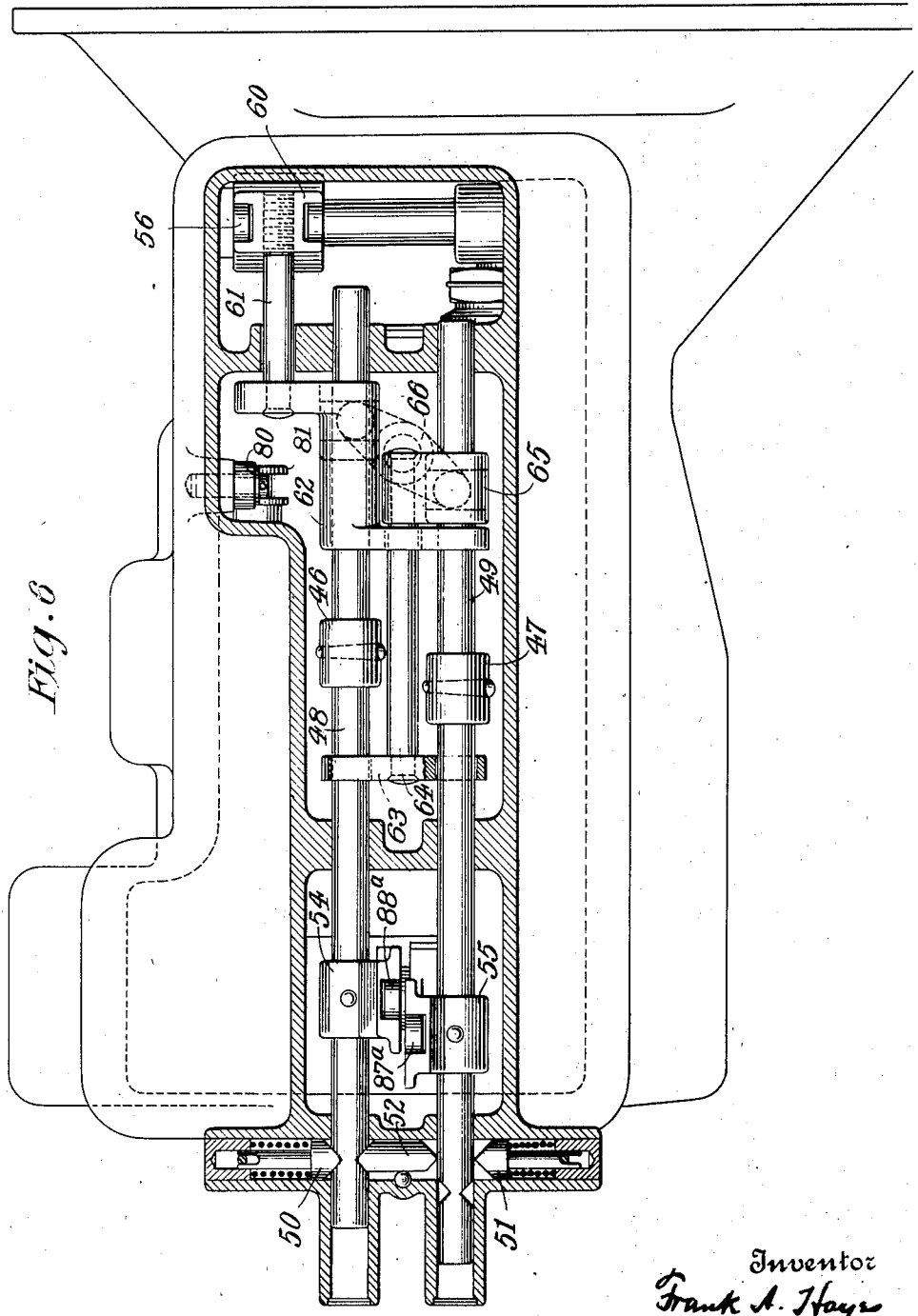

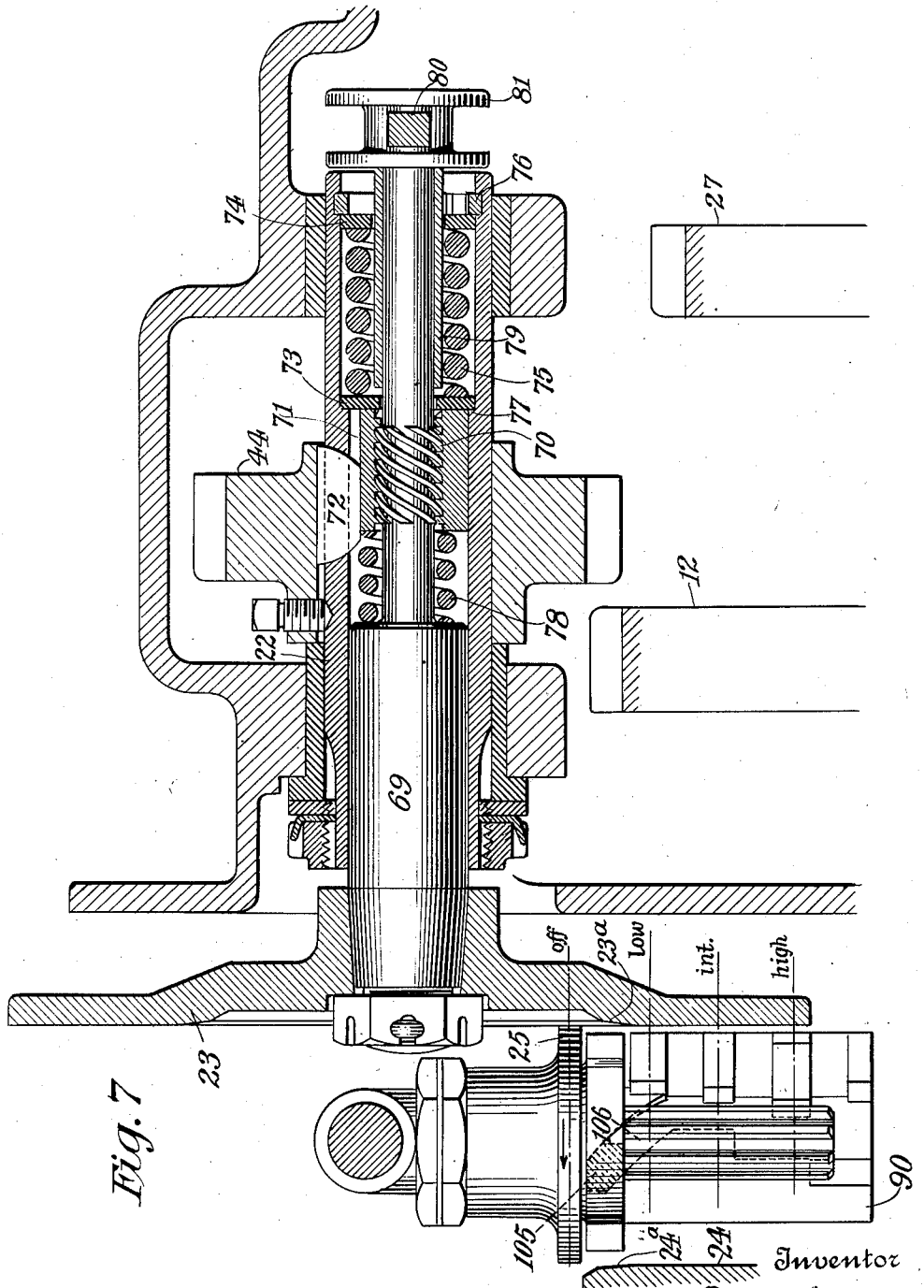

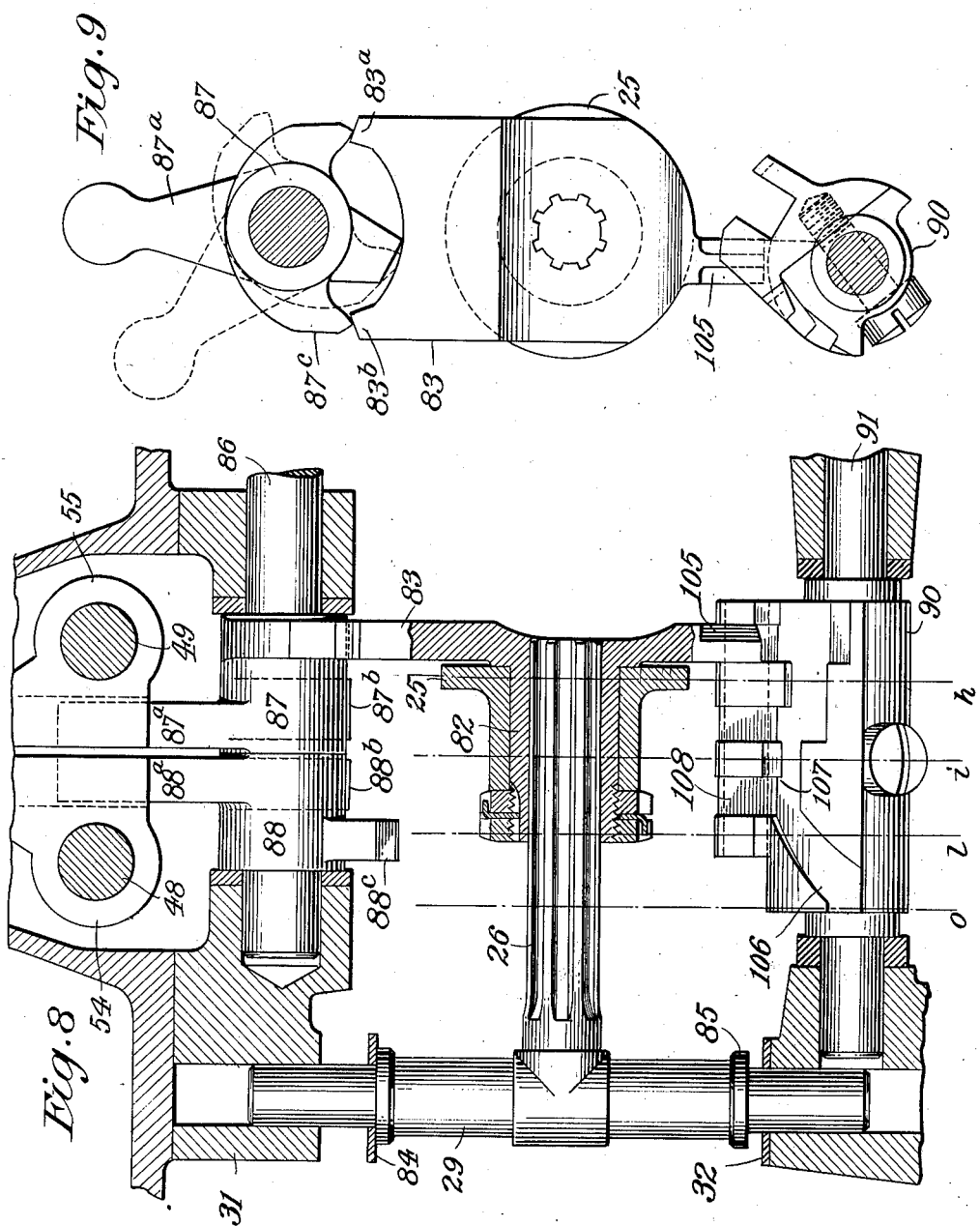

June 2, 1925.
F. A. HAYES
1,540,124
VARIABLE SPEED TRANSMISSION MECHANISM
Filed March 14, 1921   10 Sheets-Sheet 7
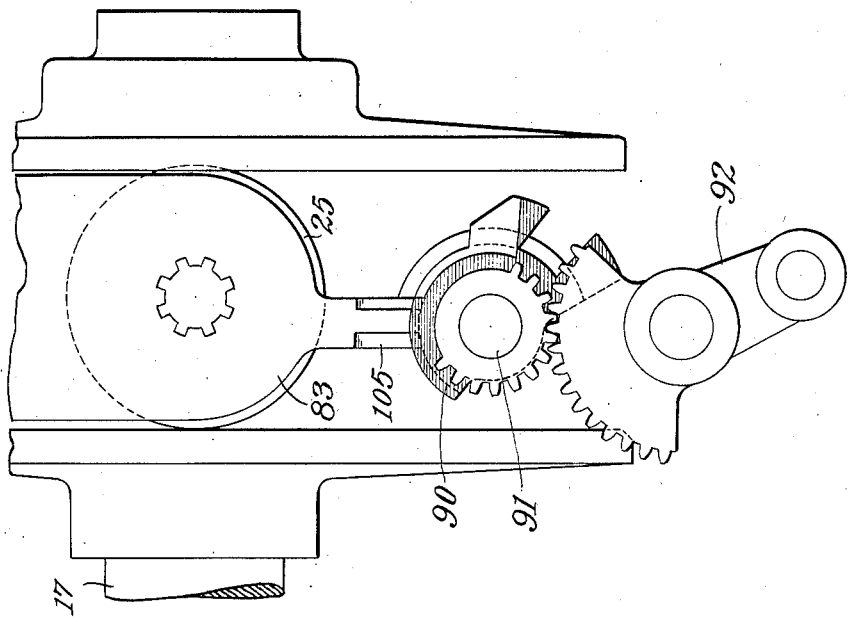
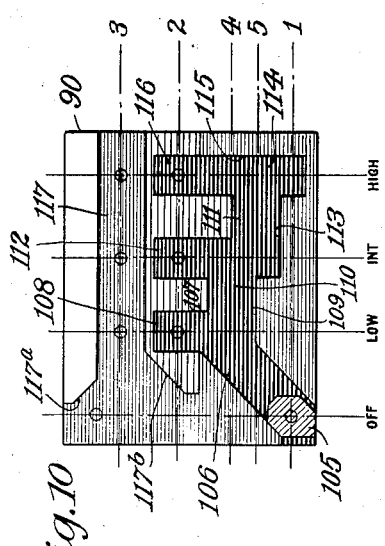
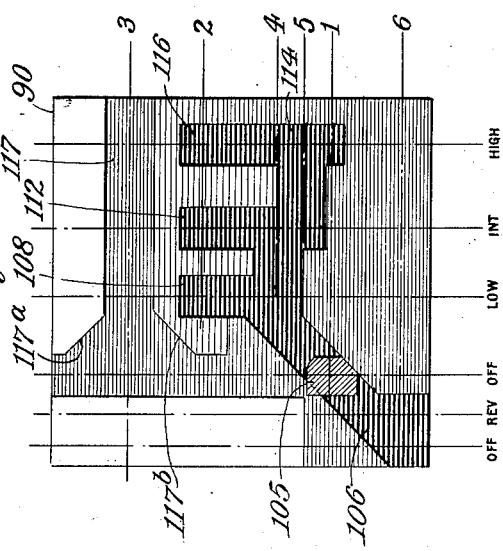
Inventor
Frank A. Hayes
By his Attorneys
Kerr, Page, Cooper & Hayward

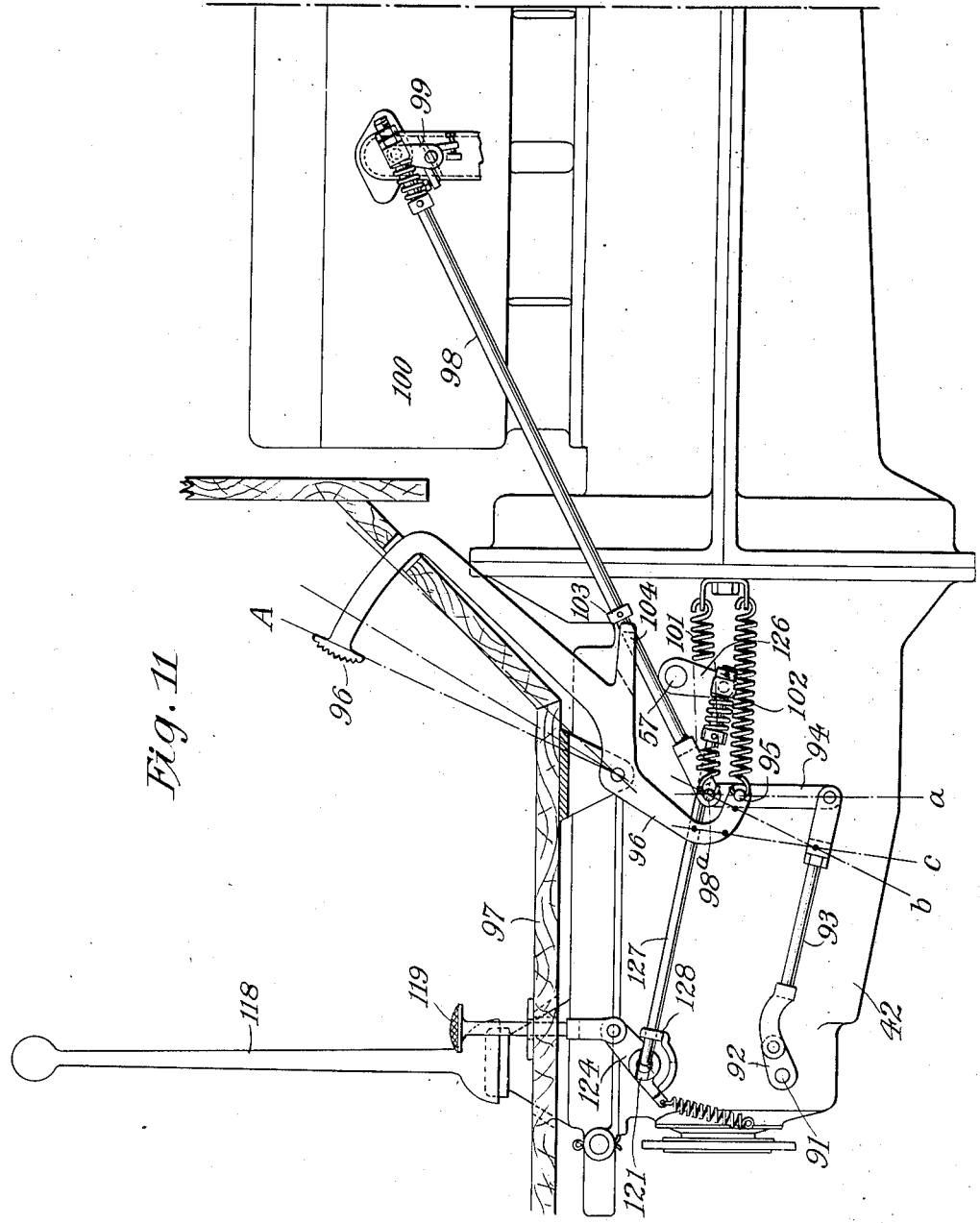

June 2, 1925. 1,540,124
F. A. HAYES
VARIABLE SPEED TRANSMISSION MECHANISM
Filed March 14, 1921 10 Sheets-Sheet 9
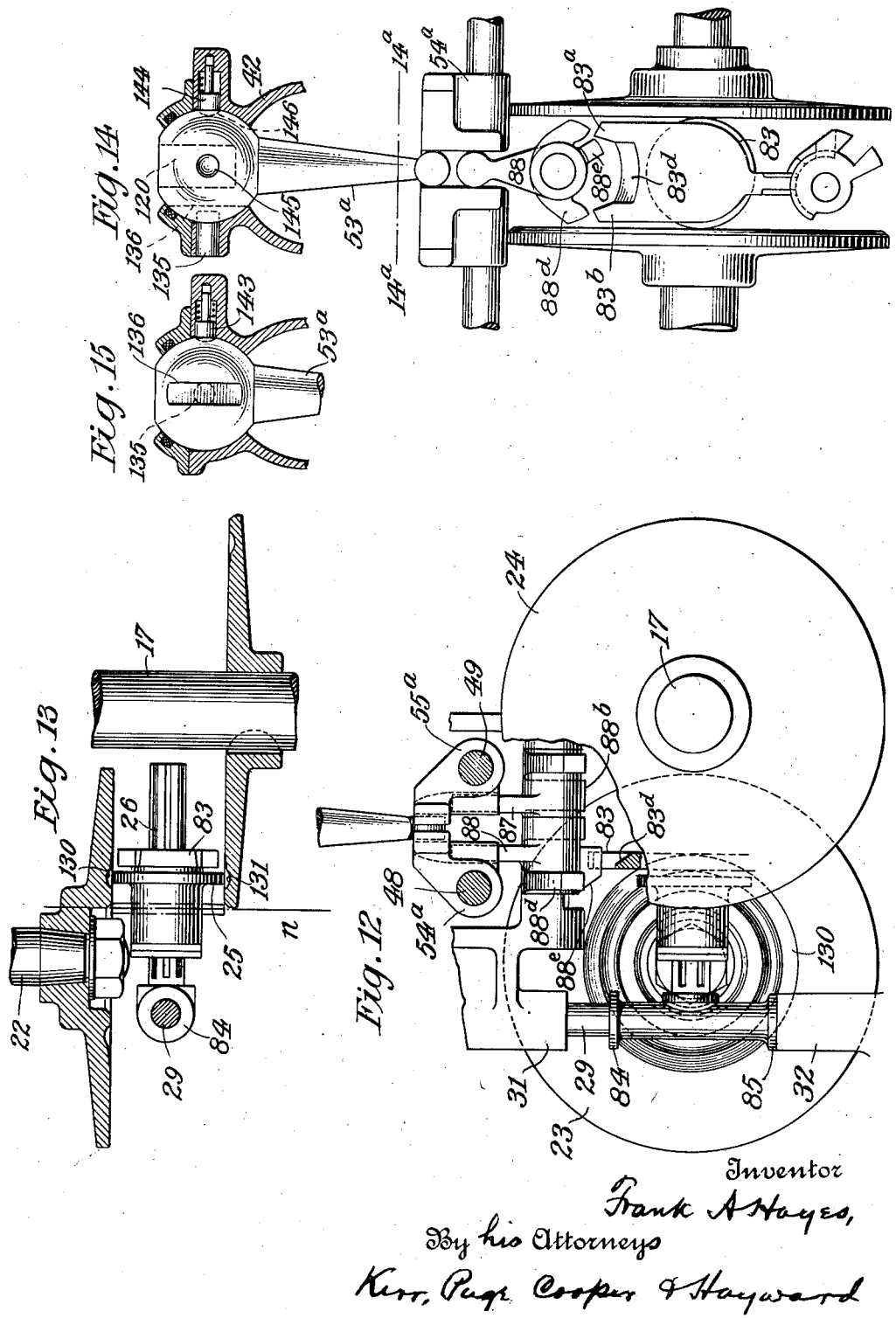

June 2, 1925.
F. A. HAYES
1,540,124
VARIABLE SPEED TRANSMISSION MECHANISM
Filed March 14, 1921    10 Sheets-Sheet 10
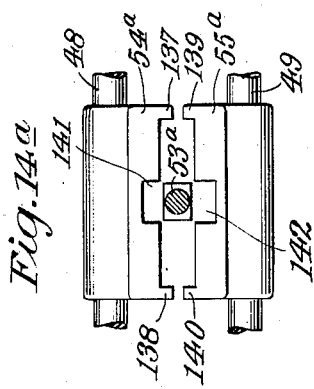
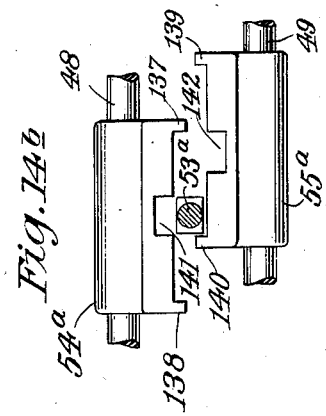
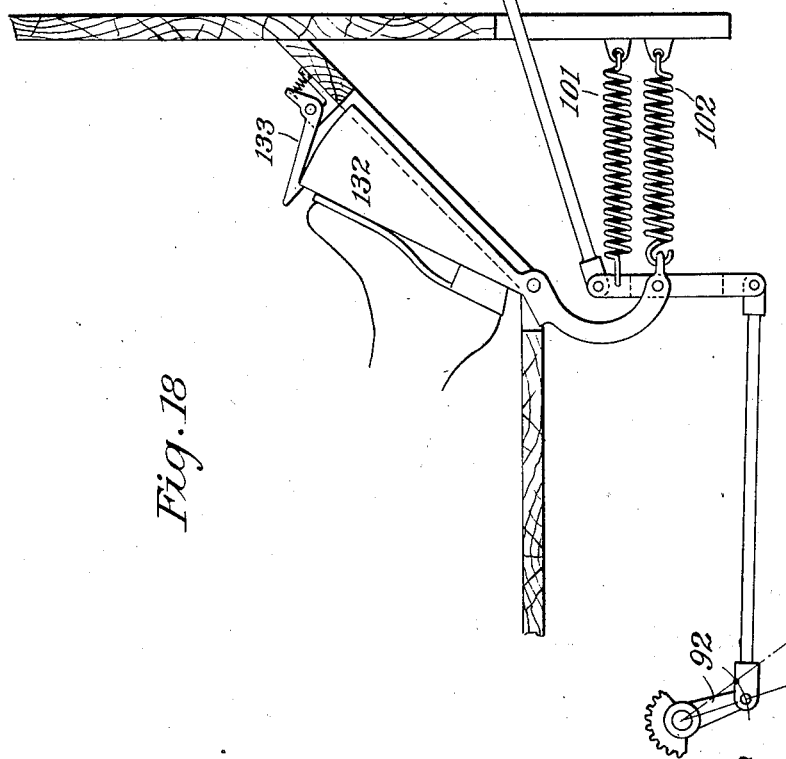
Inventor
Frank A. Hayes
By his Attorneys
Kerr, Page, Cooper & Hayward Patented June 2, 1925.

1,540,124

UNITED STATES PATENT OFFICE.

FRANK A. HAYES, OF NEW YORK, N. Y.

VARIABLE-SPEED TRANSMISSION MECHANISM.

Application filed March 14, 1921. Serial No. 452,305.

*To all whom it may concern:*

Be it known that I, FRANK A. HAYES, a citizen of the United States of America, residing at New York, in the county and State of New York, have invented certain new and useful Improvements in Variable-Speed Transmission Mechanism, of which the following is a full, clear, and exact description.

This invention relates to variable-speed power-transmission mechanism of the sliding gear type, and its chief object, briefly stated, is to provide apparatus in which the shifting of the gears into mesh can be effected only when the pitch-line velocities of the gears have a predetermined ratio, preferably near unity. Another object is to provide an apparatus in which the shifting of the gears at the predetermined velocity-ratio is effected automatically by the energy which is driving one or another of the gears. To these and other ends the invention consists in the novel features of construction and combinations of elements hereinafter described.

It is believed that the invention will find its chief utility in the automotive field, and accordingly in the subjoined description it will be explained and discussed with reference to that use, with the understanding, however, that it is not limited thereto.

In the conventional automobile transmission of the sliding gear type, proper gear-shifting involves no less than six operations: (1) close throttle, (2) release clutch, (3) shift out of one speed, (4) shift into desired speed, (5) open throttle, (6) engage clutch. Even to the skilled driver this complex series of operations, which must be performed in proper sequence and with considerable care, involves a distinct expenditure of nerve energy, even though he may be unconscious of the fact, and hence adds materially to the fatigue and danger of driving. To the novice the operations are difficult to master and greatly increase the dangers of learning to drive a car. Many persons who do not possess a natural mechanical aptitude never really master the art of changing speeds with the conventional transmission. On the other hand, in the present embodiment of my invention gear shifting while the car is in motion is effected by actuation of the engine throttle, all other operations following automatically upon the movement of the throttle and the resulting change of engine speed.

In its preferred form, herein described, my invention possesses a number of important advantages, such as ease and simplicity of operation, with practically no skill required on the part of the driver; greater safety in driving, since both hands are left entirely free for steering during speed changes; damage to the mechanism is virtually impossible in shifting; ability to shift at high car speeds; rapidity of shifting, thus greatly increasing car acceleration or "getaway"; quick and easy changing on hills, thereby increasing hill-climbing ability; not necessary to disengage clutch to permit free coasting, and any desired speed can be applied with ease after a coast; reduction of wear on clutch plates or lining because of less frequent release and engagement of clutch.

My invention in its preferred form utilizes two important features conjointly. One causes the gears to mesh and unmesh themselves. This effect is produced by the use of helical-tooth gears, or by the use of helical splines on the sliding-gear shaft, so that the sliding gear will be screwed, as it were, out of or into mesh according to which gear (the sliding gear or the axially stationary gear) is tending to drive the other. The other feature alluded to insures that at the time the gears are meshed they will be rotating at the same pitch-line velocity or with a suitable difference of pitch-line velocities, thus eliminating the disagreeable grating which would otherwise occur, and making it possible for the gears to be shifted into mesh without disengaging the clutch. This feature will be explained in detail hereinafter.

Referring to the accompanying drawings, in which the preferred embodiment is shown, Fig. 1 is a plan view of an axially stationary gear, and of a gear slidable axially on a helically splined shaft, illustrating the self-meshing and unmeshing feature of the invention.

Fig. 2 is a diagrammatic plan view of a conventional sliding-gear transmission, combined with the above mentioned features of my invention.

Fig. 3 is an end elevation of the mechanism shown in Fig. 2, viewed from the lower end of the figure.

Figure 5:
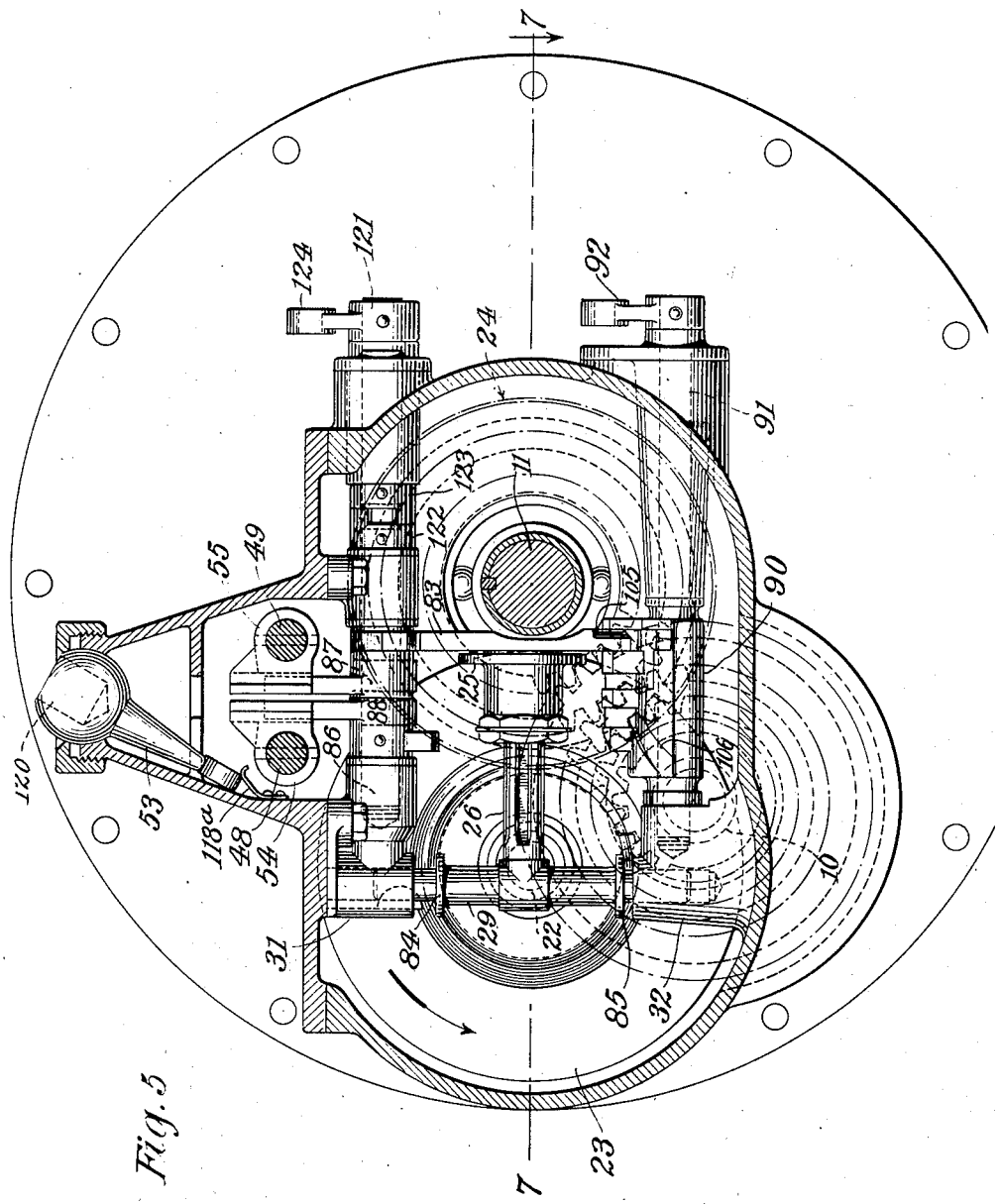

Fig. 3ª is a diagrammatic end view illustrating the operation of the selector mechanism.

Fig. 4 is a side view, partly in section, of an automobile transmission combined with my invention.

Fig. 5 is a cross section about on line 5—5 of Fig. 4.

Fig. 6 is a plan view, with the outer casing in horizontal section.

Fig. 7 is a detail section on line 7—7 of Fig. 5.

Fig. 8 is a detail section on about the same plane as Fig. 5.

Fig. 9 is a detail side view from the right of Fig. 8.

Fig. 10 is a development, on a plane surface, of the rotatably shiftable controller.

Fig. 11 is a side view of certain external parts of the mechanism as arranged in a car.

Fig. 12 is a detail view similar to Fig. 5, but illustrating a modification in which provision is made for automatic shifting into reverse.

Fig. 13 is a detail plan view of parts shown in Fig. 12, with the selector disks in horizontal central section.

Fig. 14 is a detail side view from the right of Fig. 12.

Fig. 14ª is a detail horizontal section on line 14ª—14ª of Fig. 14.

Fig. 14ᵇ is a view similar to Fig. 14ª but showing one of the parts in a different position.

Fig. 15 is a detail section of parts shown in Fig. 14 but on a plane at right angles to that of the latter figure.

Fig. 16 is a development, on a plane surface, of the controller shown in Fig. 10 as modified to provide for automatic shifting into reverse.

Fig. 17 is a detail side view showing the connection between the controller and the arm by which it is adjusted as the accelerator pedal of the car is depressed or released.

Fig. 18 is a side view similar to Fig. 11, but showing releasable means to prevent the accelerator pedal from rising to reverse position when the foot is raised.

Referring first to Fig. 1, the shafts 10 and 11 are parallel and are rotating or rotatable in the directions of the arrows, shaft 10 having an axially stationary gear 12 and shaft 11 a gear 13 slidable on a helical spline 14. Assume that gear 13 is slid leftwardly far enough to "catch" gear 12. Then if the pitch-line velocity of 12 is greater than that of 13 the latter will be rotated at a faster rate than its shaft 11 and in consequence will be "screwed" leftwardly into complete mesh, coming up against a stop 13ª. If now the velocity of shaft 11 be increased or if the velocity of shaft 10 be decreased, so that the former tends to drive the latter, gear 13 will be "unscrewed" toward the right and thus will be unmeshed. In other words, if the driving torque of the engine is transmitted by gear 12 to gear 13, the power of the engine is utilized to mesh the gears after initial engagement, and the inertia of the car to unmesh the gears when the engine is exerting a braking effect on the car, or when a clutch-brake is applied.

Referring next to Figs. 2, 3 and 3ª, the shaft 10 is connected by gears 15, 16 to shaft 17 which is driven by the engine (not shown) through a clutch 18. Shaft 10 also has fixed gears 12 and 27, and is also connected by gears 20, 21 to a shaft 22, which may be the reverse-idler shaft, on which is fixed a friction disk 23. Shaft 11, having the helical spline 14, and the sliding gears 13 and 28 adapted to be shifted axially into and out of mesh with gears 12 and 27, respectively, is equipped with a friction disk 24 overlapping disk 23 but spaced axially therefrom. It will be seen that when disk 23 is in motion the ratio of its angular speed to the angular speed of the driving gears 12, 27, is constant and is determined by the ratio of the gears 20, 21. The angular-speed ratio between disk 24 and driven gears 13, 28, when in motion, is also constant and predetermined, being unity since all those are on the same shaft. Between the two disks is a selector wheel 25, rotatable and slidable on a transverse shaft 26 by frictional engagement with the disks. Shaft 26 extends laterally from a vertical rod or stem 29, the shaft and rod forming a T-piece which can move vertically in both directions in guides 31, 32. It will be understood that shaft 11 represents the shaft which in the conventional transmission drives the propeller shaft which in turn transmits the driving torque to the rear wheels of the car.

Consider now Fig. 3ª, which illustrates in diagrammatic end view the selector disks 23, 24, and the selector wheel 25, and assume that the latter is above the line 22—11 through the axes of the disks, say at a position where it is in contact with the disks at points in a line extending perpendicularly to the plane of the figure through point 30 thereof. The movement of translation which would be imparted to the wheel by disk 24 alone at point 30 is represented in direction by the arrow *a*. Similarly the movement which would be imparted by the disk 23 alone is represented in direction by the arrow *b*. But each of these motions has a horizontal component directed toward the left, and hence if the wheel is free it will move in that general direction. It will also be seen that the velocities *b* and *a* also have vertical components, one directed upwardly and the other downwardly, and that the wheel will move up or down according to which of these components is the greater. By similar reasoning it can be shown that when the wheel is below the line 11—22 its horizontal motion will be rightward and that its vertical motion will be up or down according to the relative magnitudes of the velocities. When the wheel is on the line 11—22 the horizontal components are zero, and somewhere on that line there is a point at which, with a given speed-ratio between the disks, the positive upward and negative downward components are equal and therefore have zero as their vector sum. In such position the wheel will rotate without motion of translation. Evidently, as the speed-ratio changes, this "zero" point will shift its position on the line. Hence there is such a point for every speed-ratio; and conversely, for every point on the line there is a speed-ratio which will make the vector sum of the vertical components zero. It will also be clear that when the pitch-line velocities of gears 12 and 13 are equal the "zero" point then obtaining will be different from the "zero" point obtaining when the pitch line velocities of gears 27 and 28 are equal. In other words, each pair of gears has its own "zero" point. Assuming that there is no slippage between the wheel and the disks, that the disks are rotating at the same angular speed, and that the wheel is free to move in all directions, the path of the latter is a circle around the zero point as a center; and as this point shifts, the path of the wheel departs from the circular form. The actual values of the horizontal components of the motion of the wheel are functions of the angular speeds of the disks and of the distance of the point of contact (30) from the axial plane 11—22, only, and are therefore independent of the horizontal distances from the point 30 to the centers of the disks. Similarly, the vertical components of the wheel's motion are functions of angular speed of the disks and the horizontal distances of the point of contact (30) from the centers of the disks, only, and are therefore independent of the vertical distance of the wheel from the line 11—22. The above theory of the mechanism is derived from mathematical analysis, which it is deemed unnecessary to repeat here. Suffice it to say that for the various disk-speed ratios obtaining when the gear pitch-line velocities have unity or approximately unity ratio, points can be found (below the line 11—22) at which any increase of the speed of disk 23 will make the sum of the aforesaid vertical components positive in sign, and the resulting upward movement of the wheel can be utilized to shift the gears. If the disk 24 is wide enough to overlap the axis of disk 23, the wheel can be shifted by the disks to a position beyond the axis named. At such position disk 23 exerts a downward impulse on the wheel, even when disk 24 is stationary, and the resulting downward movement can be utilized to shift into "reverse".

Reverting to Figs. 2 and 3, assume that the selector wheel 25 is below the plane of shafts 22, 11, that the wheel is held by some mechanical means (not shown) so that it cannot move horizontally, and that both disks 23, 24 are at rest, the engine idling, and the clutch 18 disengaged. The clutch is now engaged and the engine accelerated as usual in starting a car. Disk 23 now starts. Wheel 25 then rises rapidly, and by suitable connection (not shown) with gear 13 slides the latter into initial mesh with gear 12 while the pitch-line velocity of the latter is still low and therefore but little greater than the zero-pitch-line velocity of gear 13. Further acceleration of shaft 10 starts the car and at the same time the action of the helical spline 14 draws gear 13 into complete mesh, farther movement of the gear being prevented by the stop 13$^a$ on shaft 11. The car is thus started, with the transmission in "low" or "first speed". At the instant of initial engagement of gears 13 and 12 the selector will be in a certain position, say at the point $x$ in vertical line $l$, which line may be taken to represent the "low" position of the selector. If from point $x$ the selector be kept above the line 11—22 (Fig. 3$^a$) but is allowed to move horizontally, it will travel to the left until it is out of contact with disk 24, whereupon it may be allowed to drop below line 11—22, say to the point $w$ in vertical line $o$ which may be taken to indicate the "off" position of the selector.

Assume now that gears 27 and 28 represent the "intermediate" gears, and that the car is in motion in "low" gear at a car-speed suitable for changing to a higher gear. Desiring to shift into "intermediate" or "second speed," the driver closes the engine throttle, thereby reducing the speed of the fixed low gear 12 (the engine exerting a braking effect on the car) and causing the helical spline to shift the sliding low gear 13 out of mesh. The transmission is now in neutral, the engine is idling, and the fixed gear 27 is running at a lower pitch-line velocity than gear 28. Next he opens the throttle. By suitable connection (not shown) with the selector 25 the first movement of the throttle lever or pedal shifts the selector to a position between the disks so as to be rotated thereby and impelled rightwardly under a horizontal guide, not shown, to a position beyond the line $l$, say to a point $y$, line $i$. Further movement of the throttle lever or pedal causes the engine to speed up, disk 23 also speeding up and reaching a speed at which the pitch-line velocity of gear 27 is about equal to or a little less than that of gear 28. At this instant the selector is, as stated, at point $y$ in the line $i$, representing the intermediate-speed position of the selector. By the time it reaches this point or shortly afterward, the selector has, by reason of the increasing speed of disk 23 or the increasing radius of contact thereon, or both, an upward velocity in excess of the downward velocity imparted by disk 24. At the line $i$, the selector passes the horizontal guide and instantly rises (along a vertical guide, not shown) to a position $y'$ and in so doing actuates a shifting fork, not shown, which slides intermediate gear 28 into initial engagement with gear 27. Further acceleration of the engine then causes the helical spline 14 to carry the gear into complete mesh and against stop $28^a$ on shaft 11. The initial engagement of the gears being effected, the selector escapes the vertical guide just mentioned; and, having a leftward component of motion by reason of its position above the shafts 22, 11, the selector returns to "off" position $w$ in line $o$, being kept above line 11—22 (Fig. $3^a$) by a suitable guide, not shown, until it moves out of contact with disk 24.

The car is now in second "speed," with the selector in off position. By similar procedure the gears may be shifted into "high" carrying clutch member $29^b$ into engagement with clutch member $29^a$, but enough has been said to explain generally the function of the selector. The operation of shifting into "high," shifting down, and shifting into reverse will be explained in detail hereinafter.

In practise certain of the various guides and stops that have to be shifted into different positions to guide and arrest the selector may be conveniently formed on a rotatable member or "controller" which can be turned manually to the various positions necessary. Preferably, however, it is connected with the foot throttle, as intimated above, so that the operation is controlled by the foot, leaving the hands entirely free. The controller can be and preferably is so designed that the selector can never rise (and thereby cause the initial engagement of the gears) unless the gears are running at equal pitch-line velocities or at such slight difference of pitch-line velocities as will eliminate clashing and consequent damage.

A more complete embodiment of the invention, incorporating the principles explained above in connection with Figs. 1, 2, 3 and $3^a$, will now be described.

Referring to Fig. 4, the helically splined shaft 11 is mounted in suitable bearings 40, $40^a$, carried by the gear case 42 and shaft 17. The splines are provided with a circumferential series of radial lugs $28^a$, constituting the stop similarly numbered in Fig. 2. When the intermediate sliding gear 28 is shifted leftwardly into mesh with the fixed intermediate gear 27 on countershaft 10, its movement is limited by the grooved collar 43 coming up against the lugs $28^a$. When the low sliding gear 13 is shifted rightwardly into mesh with reverse gear 44 the nut 45 on the hub of the sliding gear meets the lugs $28^a$; and in the opposite movement, by which the low sliding gear is meshed with the fixed low gear 12, the former is arrested by the nut striking the bearing 40.

"High" speed is produced by shifting gear 28, Fig. 4, rightwardly to bring internal gear or clutch member $29^b$ into engagement with external gear or clutch member $29^a$, thus giving "direct drive" from shaft 17. As previously explained, when shaft 10 (Figs. 2 and 5) drives shaft 11 the sliding gear which is taking the driving torque tends to move leftwardly due to the helical splines; but it will be seen that in the case of the clutch members or high gears 29, $29^a$ the direction of the splines is wrong and hence the latter tend to force the clutch members out of instead of into mesh when shaft 17 is driving shaft 11 directly. Accordingly the teeth of the clutch members are also made helical in form, as indicated, with a pitch-angle enough greater than that of the splines to overcome the action of the latter and to overcome also the frictional resistance encountered.

The sliding gears 13, 28, Fig. 4, are shifted by means of forks 46, 47, fixed on horizontally slidable shifter rods 48, 49, Fig. 6, which are locked in neutral by the usual spring plungers 50, 51. A lock 52 is provided to permit only one gear to be slid into mesh at any one time. In Fig. 6, rod 48 is in neutral and cannot be shifted until rod 49 is shifted to carry its gear 28 (Fig. 4) out of mesh. Rods 48, 49 are shifted by the selector as explained hereinafter, or by a hand lever 53 in the conventional manner. For this purpose the lever is adapted to engage at will either collar 54 or collar 55, pinned on the respective rods.

The transmission can also be cleared, that is, both sliding gears can be brought into neutral, by depression of the clutch pedal, not shown. The devices provided to accomplish this result are shown in Figs. 4 and 6. Referring to these figures, forked lever 56 is connected in any convenient and suitable manner (preferably adjustably) to shaft 57 carrying the fork 58 which, when the shaft is rocked by depression of the clutch pedal, disengages clutch 18 against the tension of a spring 59. Lever 56, rocked by the same operation that disengages the clutch, cooperates with a collar 60 fixed on a short stem 61, slidably mounted, and fixed to an arm of a Z-shaped yoke 62, so that as collar 60 and stem 61 are actuated the yoke will be shifted on rods 48, 49. Block 63, which can slide on the rods named, is connected by rod 64, shiftable axially through yoke 62, to block 65 slidable on rod 49. A lever 66, fulcrumed at 68, is connected at its ends to yoke 62 and block 65. It will therefore be seen that when stem 61 is moved leftwardly by depression of the clutch pedal, it will slide yoke 62 in the same direction. At the same time, yoke 62 rocks lever 66 counter-clockwise (Fig. 6) thereby sliding the block 65 rightwardly, which carries rod 64 and yoke 63 in the same direction. If, then, gear 13, Fig. 4, is in mesh with gear 12, fork 46 will be in the path of rightwardly moving yoke 63 and will be shifted thereby, thus unmeshing the gears named. If gear 13 is in mesh with reverse gear 44, the fork will be in the path of yoke 62 and will be shifted leftwardly thereby, thus disengaging gear 13. Similarly, gear 28 will be shifted into neutral by yoke 62 or yoke 63 engaging fork 47, according as the gear is in mesh with high gear 29ª or with intermediate gear 27.

Selector disk 23, Fig. 7, is rotated by the reverse idler shaft 22 but is not mounted directly thereon. Instead, it is fixed on the outer end of a stud 69 which extends into the shaft (made in tubular form for the purpose) and has on its reduced inner portion a left-hand thread 70 cooperating with a nut 71 held against rotation by a key 72 which also keys reverse gear 44 to the hollow shaft. Encircling stud 69 in front of nut 71 is a heavy spring 75 bearing against loose washers 73, 74, the latter resting against a split spring ring 76 in an inner groove in the shaft. When the engine is idling or moving very slowly with respect to the car, disk 23 is moving very slowly with respect to disk 24, and the latter therefore drives the former (and stud 69 also) through selector wheel 25, faster than shaft 22. Under these circumstances nut 71 is backed off leftwardly, away from spring 75, the expansion of which is limited by washer 73 bearing on a shoulder 77; with the result that disk 23 is urged rearwardly only by spring 78, in rear of nut 71. But when the throttle is opened and the speed of disk 23 is caused to exceed that of disk 24, the selector wheel (25) tends to move upward. Any resistance to this motion holds back disk 23, causing shaft 22 to run ahead of the disk, with the result that nut 71 is screwed forwardly (toward the right in Fig. 7), thereby compressing spring 75 until washer 73 strikes the spacer 79 encircling the forward portion of stud 69. The pressure of spring 75 is thus added to that of spring 78 to hold disk 23 in contact with selector wheel 25 and thereby provide the frictional force necessary to enable the selector to shift the gears. It is to be noted that in Fig. 7 the selector wheel is shown in the "off" position. When the clutch is disengaged, disk 23 is shifted forwardly to permit the selector wheel to be moved into position between the disks without effort. This advance of disk 23 is accomplished by yoke 62 (Fig. 6) striking the upper end of lever 80 (Figs. 4, 6 and 7) the lower end of which engages collar 81 and thus shifts stud 69.

Disk 24 is fixed on the driving flange hub 11ª, which is in turn keyed to shaft 11, as shown in Fig. 4.

The selector wheel 25 is mounted to rotate freely on a hollow stud 82, Figs. 5, 7 and 8, which is slidable on the splined arm 26 extending laterally from the stem 29. Stud 82 is fixed on a vertical shifter-plate 83, so that as the selector wheel 25 moves axially on arm 26 it will carry the plate with it to the various shifting positions from which the selector rises to shift the gears. The upward and downward movements of the selector 25 and plate 83 are limited by the shoulders 84, 85 on the stem 29, striking the guides 31, 32.

As before stated, the shifting of the gears 13, 28, and 29ᵇ into initial engagement with gears 12, 27, 29ª, is effected by shifter rods 48, 49. The latter are shifted by the selector plate 83 (itself actuated by the selector wheel) through the medium of parts which will now be described.

Above the splined arm 26 on which the selector wheel rotates is a transverse shaft 86 (Figs. 4, 5, 8 and 9) on which is mounted a pair of shifter levers 87, 88, having upwardly extending arms 87ª, 88ª, cooperating respectively with the shifter collars 55 and 54. The latter, it will be remembered, actuate the shifter rods 49 and 48 which in turn actuate the shifter forks 47 and 46 (Figs. 4 and 6). The levers 87, 88 have branched lower arms. When the selector wheel is in the "low" position it is in the plane of line $l$, Fig. 8. In this position the plate 83 is in the plane of cam-arm 88ᵇ of lever 88, so that when the plate rises its cam-finger 83ª will engage the cam-arm mentioned and rock the lever 88, which in turn shifts rod 48 toward the left (Fig. 6) and thereby slides gear 13 (Fig. 4) into initial mesh with gear 12, after which complete engagement is produced by the action of the helical splines on shaft 11. In this upward movement of plate 83 it is prevented from moving horizontally by a controller, described hereinafter, but as it reaches its upper position it escapes the controller, whereupon the selector wheel 25, being then above the axial plane of the disks 23, 24, moves leftwardly until it strikes the lower arm 88ᶜ of lever 88. By this time, however, the wheel has also a downward component of motion, due to the decrease of the radius of contact on disk 23. Hence when the plate 83 is arrested by stop 88ᶜ the wheel (and plate) move downwardly, escaping the stop and then continuing their leftward and downward movement to the "off" position represented by line o, Fig. 8. In this position the selector wheel 25 is entirely disengaged from both disks, as indicated in Fig. 7.

To shift from "low" into "intermediate" (the car having been accelerated to a speed suitable for intermediate gear) the engine is throttled down, thereby causing gear 13 to go into neutral by the action of the helical splines. The accelerator pedal is then depressed. The first effect of the latter operation is to draw the selector wheel into engagement with the disks, causing it to move rightwardly (Fig. 8) past "low" to the "intermediate" position indicated by the line i. To permit easy movement of the wheel from its "off" position into engagement with the disks the latter are each provided (Fig. 7) with a slight chamfer, as 23$^a$, 24$^a$, which is less than the angle of friction. As soon as the disks begin to move the selector, the engine throttle is opened and the disk 23 begins to speed up, so that when the selector reaches position i, or shortly after, it will move upwardly, bringing cam-finger 83$^a$ against cam-arm 87$^b$ on lever 87, thereby rocking the latter and shifting gear 28 into initial mesh with gear 27 through the agency of collar 55, shifter rod 49, and fork 47. Its upward movement completed, the selector moves to the off position.

In shifting from intermediate into high, the selector moves past the low and intermediate positions to high position, h, Fig. 8, then rises and brings cam-finger 83$^b$ (see also Fig. 9) into engagement with cam-arm 87$^c$ on lever 87. This action rocks lever 87, which in turn shifts rod 49 and fork 47 rightwardly (Fig. 6), carrying gear 28 in the same direction (Fig. 4) and bringing clutch member 29$^b$ into initial engagement with member 29$^a$. The latter parts are then drawn into complete mesh by the action of their helical teeth, as previously explained, and the selector returns to its off position.

The controller, by which the selector wheel is guided and limited in its motion, is shown at 90, Figs. 4, 5, 7, 8, 9 and 10, and comprises a circumferentially and axially slotted member fixed on a transverse rock-shaft 91 arranged between the selector disks 23, 24 and below the stem 26 on which the selector wheel slides. The outer end of the shaft is connected by a crank 92 (Figs. 5 and 11) and adjustable link 93 to the lower end of a lever 94 which is fulcrumed at 95 on the forwardly curved lower end of the accelerator pedal or foot-throttle lever 96, the latter being pivoted on the underside of the floor-boards 97. The upper end of lever 94 is connected by link 98 to an arm 99 which is intended to represent the throttle valve lever of the internal combustion engine or motor 100. Springs 101, 102 are provided, to hold the parts yieldingly in the positions shown in Fig. 11. When the accelerator or throttle-pedal 96 is depressed from the closed-throttle position, indicated by line A, the lever 94 is rocked clockwise on pin 98$^a$ as a fulcrum, from position a to position b, thereby rocking arm 92 and controller 90 counterclockwise. During this operation, link 98 is held from leftward movement by its stop 103 which bears against a bent finger 104 on the pedal. Further depression of the pedal permits the stop to pass the finger, permitting the lever 94 to move bodily, say as far as position c, thus rocking the controller still farther and at the same time opening the throttle valve of the engine.

When the controller is in position 1, Fig. 10, with the selector wheel in off position, Fig. 7, the downwardly extending finger 105 on the selector plate 83 is in the left hand portion (see also Figs. 5, 7 and 8) of the helical controller-slot 106, but as the controller is rocked by depression of the accelerator pedal the cam action of the slot carries the finger, and with it the selector plate and selector wheel, rightwardly until the finger meets the controller-stop 107, whereupon the rightward movement of the selector ceases and the controller notch 108 embraces the selector plate finger, preventing movement of the finger in either horizontal direction. The selector is then in "low" position, indicated by the line so marked in Fig. 10. The acceleration of the engine now speeds up disk 23; and when the pitch-line velocity of gear 12 has the proper ratio to the pitch-line velocity of gear 13 the selector rises and shifts the gears into initial engagement. Preferably the positions of the selector are so chosen that the ratios at which the selector rises are somewhat less than those at which it is desired to have the initial engagement of the gears take place, so that when the gears come together the desired ratio will exist; it being remembered that the gear 12 is speeding up (as are also gears 27 and 29$^a$) and that the ratios are, in general, increasing. If the gears come together at exactly unity ratio, and if at that instant the teeth of the two were aligned instead of the teeth of one being aligned with the spaces on the other, the two would not mesh, and it might so happen that this condition would exist for an appreciable time. To aid in meshing the gears under such conditions the teeth may have the usual chamfer at their meeting edges. Preferably, also, they are made to meet with a velocity ratio which is slightly greater than unity, so that the non-sliding gear will be running ahead. Hence the teeth on the two can never be lined up for more than a fraction of a second, and the initial engagement will in all cases be produced practically at the very instant the gears meet.

As the initial engagement of the gears 13 and 12 is effected the finger on the upwardly moving selector plate escapes from notch or slot 108 (Fig. 8) and the selector returns to off position as already described, while the controller itself, under the action of spring 101, Fig. 11, and being no longer restrained by the finger, swings over to position 3, Fig. 10.

To shift into second or intermediate speed the throttle is closed by taking the foot off the accelerator momentarily. This permits the controller to return to initial position (1, Fig. 10) whereupon the finger 105 drops into the slot 106. When the pedal is again depressed the finger is drawn rightwardly by the slot and the selector moves to low position in slot 108, but, the throttle being still closed to idling position, the selector does not rise out of the slot, since the downward impulse exerted by the disk 24 exceeds the upward impulse exerted by the disk 23. The pedal is now released and quickly depressed again. The first action permits the controller to swing (clockwise, Fig. 11) toward position 1, Fig. 10, until the edge 109 of longitudinal slot 110 strikes the selector finger, whereupon the selector moves again toward the right, until it is arrested by stop 111, at which point the depression of the pedal carries "intermediate" notch or slot 112 down over the finger. The engine, being accelerated by the opening of the throttle, speeds up the gear 27, Fig. 4, and when the now increasing ratio between the pitch-line velocities of gears 27 and 28 reaches the proper predetermined value the selector moves up and shifts the gears into initial engagement. At the same time the finger 105 escapes from slot 112 and the selector returns to its off position, and the controller, no longer restrained by the finger, swings on to position 3 (Fig. 10) under the tension of spring 101 as previously described.

To shift into "high" the operation is the same, except that the accelerator pedal is released and depressed three times instead of twice. The second release and depression brings the selector finger into the intermediate or second speed notch 112. The third release carries the notch away from the selector finger and brings the edge 113 of longitudinal slot 114 against the finger whereupon the selector moves toward the right until arrested by stop 115 at the end of slot 114. The third depression of the pedal carries the high speed slot or notch 116 over the finger, and when the pitch-line velocity-ratio of clutch members 29$^b$ and 29$^a$ has the right value, that is, when the angular velocities of shafts 11 and 17 are equal, the selector rises and shifts the gears into initial engagement. The selector finger then escapes from notch or slot 116 and returns to its off position, while the controller swings on to position 3, Fig. 10, as already described.

In "shifting down", say from high to second speed, the operation is the same as in shifting up from second to high except that the third release and depression of the accelerator pedal is omitted, and, instead, the operator at the second depression merely presses the pedal far enough to speed up the engine, thereby accelerating gear 27. When its pitch-line velocity has the proper ratio to that of gear 28 the selector rises and effects the initial shift. In shifting down from second to low, the second and third operations of the accelerator are omitted and the motor is speeded up at the first depression of the pedal.

In practise the operation of shifting into high need not involve three distinct actuations (up and down) of the accelerator pedal. If the pedal is depressed lightly, just far enough to bring the selector wheel between the disks, the wheel will move into intermediate shifting position without being engaged by the low slot 108, and when it drops into the slot 114 the impulse can be felt. Further depression of the pedal immediately afterward will then cause the selector to rise (finger 105 being engaged and guided by slot 116) and shift the gears into high. The driver soon learns to operate the controller by the "feel" of the action. The movements of the selector are extremely rapid, with no appreciable lag behind the movement of the controller, so that if the engine has good "pick-up" the gears can be shifted as fast as the driver can operate the pedal.

It will be seen that the function of the controller 90 is chiefly to guide the selector in the automatic movement thereof and to limit the axial movement of the selector. It shifts the selector (by means of the helical cam slot 106) from "off" position into engagement with the disks. When the car is at rest, with the clutch disengaged and the selector disk 23 advanced, the controller not only carries the selector to a position between the disks but also carries it on to the "low" position; but after the car is started the controller does not shift the selector except to bring it into engagement with the disks. From that time on, the selector is moved by the energy exerted upon it by the disks. In other words, the controller cannot force the selector into any position except into low, and then only when the clutch is released and the disks separated. For instance, suppose the operator steps on the throttle with the car standing, engine running, gears in neutral, and clutch engaged. The selector will of course be drawn into engagement with the disks.

Disk 24 is at rest and hence exerts no downward impulse upon the wheel, while disk 23 is rotating and hence exerts an unopposed upward impulse, with the result that the selector will rise at the instant it engages disk 23 and will carry finger 105 out of slot 106 so that the controller will have no further control over the finger and selector. It is therefore impossible to move the selector into low position with the car at rest unless the clutch is disengaged. Again, suppose that after accelerating the car in low and starting to go into second, the speed of the engine (and of gear 27) is too great for shifting. In that case the excessive speed of disk 23 will cause the selector to rise before the guiding finger 105 reaches the stop 111; and, rising above the plane of the axes of the two disks without its horizontal motion being restrained by slot 112, the selector will move leftwardly toward "off" position without actuating the shifter fork. Hence, to get the selector into intermediate or second position the speed of the gear 27 must be reduced by throttling down the engine. It will thus be seen that the action of the controller-selector combination is practically proof against improper operation, it being impossible to put a pair of gears in mesh when one of them is running too fast or too slow, or to damage gears or selector.

The controller 90 (Figs. 7 and 10), has three surfaces, at three different "levels", so to speak, with respect to the axis of the controller. These surfaces are indicated by the shadings in Fig. 10. The heavily shaded portion indicates a surface which is so low that when the finger 105 (Fig. 5) is in contact with it the selector-wheel axis is below the axial plane of the disks, and when in this position the wheel tends to travel toward the right. After rising above the axial plane mentioned, the selector finger moves toward the left unless prevented by one or another of the slots 108, 112, 116. If, after reaching one of these slots, its upward component of velocity in sufficient to carry it up out of the slot, it immediately moves leftward, and if at any time thereafter its upward component decreases fast enough to let the finger fall upon the controller the finger will find directly under it the next higher surface forming the bottom of slot 117, represented by the lighter shading, for the reason that as soon as the finger rises out of the slot or notch the spring 101 (Fig. 11) immediately swings the controller over to position 3, Fig. 10. This surface is high enough to prevent the selector from descending below the axial plane of the disks and hence it must continue its leftward movement to the off position. At the left of slot 117 are two inclines 117$^a$ and 117$^b$, designed to exert a camming action on the finger and thereby positively compel the selector to move off of disk 24 to the position indicated by the line marked "off" in Fig. 10. The highest surface of the controller is unshaded, and the finger can never rise above it by reason of collar 84 on stem 29, Fig. 5, which collar is designed to meet the guide 31 just before the lower end of the finger would rise above the unshaded surface.

In the embodiment illustrated in Figs. 4 to 11, shifting into reverse is accomplished by the hand or foot of the operator, by means of the hand-actuated lever 53, Figs. 4, 5, and 11, or pedal 119, Fig. 11. The lever has the conventional ball-and-socket universal mounting, so that it can pick up collar 54 or 55 at will. When not in use it is swung to the inoperative position shown in Fig. 5 and is held there by a spring clip 118$^a$, the outer or manual portion of the lever being removed from the socket 120, so as to be out of the way. The pedal 119 shifts the gears into reverse through the agency of the following devices. Lever 88, which actuates shifter rod 48, Fig. 5, is pinned to shaft 86, which is connected with the aligned shaft 121 by a lost-motion clutch composed of two members 122, 123 pinned to the two shafts. On the outer end of shaft 121 is a crank-arm 124 connected directly to the pedal 119. Hence depression of the pedal first takes up the play in the clutch, then rocks the shaft 86 and lever 88 clockwise, thereby advancing shifter rod 48 and shifting gear 13, Fig. 4, into initial engagement with the reverse idler gear 44 driven by gear 125 on the countershaft 10. The play in the clutch permits shifting into low gear without affecting arm 124.

Pedal 119 is locked so long as the clutch 18 (Fig. 4) is engaged. For this purpose shaft 57 is provided with an arm 126 to which is pivoted a locking bolt 127 extending rearwardly through a fixed guide 128 and into a downwardly open slot in the arm 124. When shaft 57 is rocked by disengaging the clutch, locking bolt or rod 127 is advanced, thus freeing shaft 121 and permitting the same to be rocked by the pedal. The mechanism just described prevents shifting into reverse while the clutch is engaged and thus prevents the possible damage which that operation might cause.

In the modification illustrated in Figs. 12 to 18 inclusive, provision is made for automatic shifting into reverse, under control of the accelerator pedal, as in the case of the forward speeds. For this purpose disks 23 and 24 are provided with circular grooves 130, 131, which define the "off" position which the selector wheel 25 takes after shifting into a forward speed. If, by means of the controller (the clutch being disengaged), the selector is shifted farther leftwardly, re-engagement of the clutch will bring the disks and selector again to contact, whereupon the selector will again rise since when reverse is attempted the car and hence disk 24 are motionless and the latter is therefore exerting no downward impulse on the wheel. After shifting into reverse, the wheel again moves leftwardly to another "off" position, n, indicated by the dotted position of the wheel in Fig. 13. When it is desired to shift into low forward speed the clutch is disengaged, thus separating the disks and permitting the controller to draw the selector wheel rightwardly past the grooves 130, 131 (or "neutral" position of the selector) to the low forward position, as previously described.

To enable the controller 90, Fig. 16, to shift the selector leftwardly beyond the neutral position n, Fig. 13, the helical slot 106 is extended leftwardly, and provision is made for a backward rocking movement of the controller, corresponding to an upward movement in Fig. 16. For this purpose the normal upper (or neutral) position of the accelerator pedal 132, Fig. 18, is determined by the spring-actuated clip 133. If this is kicked off the springs at once rock the pedal to the "reverse" position indicated in dotted lines, at the same time rocking the arm 92 counter-clockwise from its "off" position. This arm is geared to shaft 91, as shown in Fig. 17, so that the counter-clockwise movement of the arm gives the controller a clockwise movement, which by the agency of the cam slot 106 shifts the finger 105 toward the left and with it the selector 25. When the pedal is again depressed, to accelerate in reverse or (the car having been stopped and the clutch disengaged) to shift into low and start the car, the clip or detent 133 snaps down to its normal position, and thereafter prevents the pedal from rising to reverse position when the foot is raised.

To shift sliding gear 13 (Fig. 4) into mesh with the reverse gear 44 the fork 46 must be shifted rightwardly. This is effected by the horn 83$^b$ of selector plate 83 (Fig. 14) actuating cam-arm 88$^d$ of forked lever 88. To insure leftward movement of the selector to the "reverse off" position after shifting, the selector plate is provided with a bevel 83$^d$ between its horns, which, cooperating with the correspondingly beveled depending finger 88$^e$ on lever 88, cams the plate and selector toward the left as they rise under the combined impulses of disk 23, which always rotates counterclockwise, and of disk 24 which now (the car being in motion backwards) rotates clockwise. As soon as the selector escapes both disks it falls by its own weight to a position below the axial plane of the disks and the finger 105 then rests on the heavily shaded surface at the left end of slot 106.

The lever 53$^a$, Figs. 14, 14$^a$ and 15, has the conventional ball-and-socket mounting in the cover of the gear case 42, and is prevented from rotating by the usual stud 135 engaging the slot 136. The lower end of the lever extends between the collars 54$^a$, 55$^a$, on the shifter rods 48, 49. These collars are elongated and at the top are spaced apart as indicated in the plan view, Fig. 14$^a$, (which shows the position of the collars when the gears are in neutral) to permit the lever to be rocked between them without engaging either, but at their ends the collars are provided with inwardly extending lugs 137, 138, 139, 140. In shifting by hand, the lever is rocked transversely into one or the other of the notches 141, 142. Normally the lever stands in the position shown in Fig. 14$^a$ and remains in such position when the gears are shifted by the automatic mechanism. Thus Fig. 14$^b$ shows the position of the collars after collar 55$^a$ has been actuated to put the gears in high, but it will be observed that the lever remains in its neutral position. Then if it is desired to shift the gears into neutral by hand it is not necessary to know which gears are in mesh and then hunt for the proper notch, 141 or 142 as the case may be. Instead, the operator simply swings the lever back and forth between the collars without rocking it laterally. The lever then engages whichever lug (137, 138, 139 or 140) is in its path and shifts the collar as far at it will go. The engaging end of the lever is too narrow to permit engagement with both notches 141, 142 at the same time, and its amplitude of fore-and-aft swing is too limited (as by the ball-and-socket mounting, Fig. 14) to permit shifting the collars past their neutral position by engagement with their lugs. In short, to shift into mesh, the lever must be swung into one of the notches. Mere rocking of the lever forwardly and rearwardly can only restore a pair of meshed gears to neutral.

To hold the lever 53$^a$ yieldingly in its normal position, Figs. 14 and 15, it is provided with spring locks of the ball type, indicated at 143, 144, which engage spherical recesses 145, 146, in the ball of the lever. It will be understood that the locks are spaced angularly 90° apart, so that a substantial effort (exerted on a handle, not shown, inserted in socket 120) will be required to swing the lever in either direction out of its normal position. It is to be understood that the hand-shift mechanism described in this and the preceding paragraph can be used interchangeably with the devices illustrated in Figs. 4, 6 and 7 for bringing all gears into neutral by disengaging the clutch. Or both may be employed; in which case the gears can be restored to neutral by hand or by disengaging the clutch, as will be readily understood.

It is to be understood that the invention is not limited to the specific details of construction herein described, but can be embodied and practised in other ways without departure from its spirit.

I claim—

1. In a transmission mechanism, the combination with a pair of gears shiftable into mesh by relative axial movement, of means acting automatically to cause such relative movement and dependent for operation upon a predetermined pitch-line velocity ratio of the gears.

2. In a transmission mechanism, the combination with a pair of gears shiftable into mesh by relative axial movement, of a device acting automatically to cause such relative movement and dependent for operation upon a predetermined pitch-line velocity ratio of the gears, and controlling means operable at will to control the action of said device.

3. In a transmission mechanism, the combination with a plurality of driving gears and a plurality of driven gears, shiftable into mesh in pairs by relative axial movement, of a device acting automatically to cause such relative movement of a pair of gears and dependent for operation upon a predetermined pitch-line velocity ratio of the gears, and controlling means operable at will to determine which pair of gears will be meshed.

4. In a transmission mechanism, the combination with a pair of gears shiftable into mesh by relative axial movement; of means acting automatically to cause an initial relative movement of the gears when the pitch-line velocities thereof have a predetermined ratio, to effect initial or partial engagement of the gears; and automatic means utilizing the rotary motion of the gears to complete the relative movement and produce complete engagement.

5. In a transmission mechanism, the combination with a pair of shafts, and a pair of gears thereon, shiftable into mesh by relative axial movement, of means acting automatically to cause an initial relative movement when the pitch-line velocities of the gears have a predetermined ratio, and a helical spline on at least one of the shafts to cause complete axial movement of the gear thereon after the gears have been initially engaged.

6. In a transmission mechanism, the combination with a pair of gears on separate shafts, one of the gears being shiftable axially into and out of mesh with the other; of a device acting automatically to cause an initial axial movement of the shiftable gear when the pitch-line velocities of the two have a predetermined ratio; and a helical spline on the shaft carrying the shiftable gear, to complete the shifting movement when the other gear begins to drive the same.

7. In a transmission mechanism, the combination with a pair of gears shiftable into mesh by relative axial movement; of means acting automatically to cause such relative movement, said means including a pair of overlapping axially spaced disks rotating in harmony with the gears, a revolving member between the disks, rotated by the disks and shiftable thereby, and shifting mechanism connecting said member with at least one of the gears to move the same axially into engagement with the other.

8. In a transmission mechanism, the combination with a plurality of driving gears and a plurality of driven gears, shiftable into mesh in pairs by relative axial movement; of means acting automatically to cause such relative movement of a pair of gears, said means including a pair of overlapping spaced disks rotating in harmony with the driving gears and driven gears respectively, a wheel between the disks for rotation thereby and adapted to be shifted thereby axially and transversely, and shifting mechanism actuated by the wheel to produce the aforesaid relative axial movement of one or another pair of gears according to the extent of the axial movement of the wheel; and means operable at will to determine the extent of the axial movement of the wheel.

9. In a transmission mechanism, the combination with a pair of gears shiftable into mesh by relative axial movement; of means acting automatically to cause such relative movement and thereby effect a partial engagement of the gears, said means including a pair of overlapping axially spaced disks rotating in harmony with the gears, a revolving member between the disks, rotated by the disks and shiftable thereby, and shifting mechanism connecting said member with at least one of the gears to move the same axially into partial engagement with the other; and automatic means utilizing the rotary motion of the gears to complete said axial movement and produce complete engagement of the gears.

10. In a transmission mechanism, the combination with a driving gear and a driven gear one of which is slidable axially into mesh with the other; a disk rotating in harmony with the driving gear; a second disk, overlapping the first, and rotating in harmony with the driven gear and in the same direction as the first disk; a selector wheel movable axially and transversely between the disks and rotated by frictional engagement therewith; shifting mechanism connecting the selector wheel with the slidable gear to shift the latter into mesh with the other gear; and controlling means operable at will to control the operation of the wheel.

11. In a transmission mechanism, the combination with a plurality of driving gears and a plurality of driven gears, shiftable into mesh in pairs by relative axial movement; of means acting automatically to cause such relative movement of a pair of gears when the pitch-line velocities thereof have a predetermined ratio, said means including a pair of overlapping spaced disks associated with and rotating in harmony with the driving gears and driven gears respectively, a wheel between the disks for rotation thereby and adapted to be shifted thereby axially and transversely, and shifting mechanism actuated by the wheel to produce the aforesaid relative axial movement of one or another pair of gears according to the extent of the axial movement of the wheel; adjustable means to determine the extent of the axial movement of the wheel; and means operable at will for varying the speed of the driving gears and the disk associated therewith, and connected with the adjustable means to adjust the same.

12. In a transmission mechanism, the combination with a plurality of driving gears and a plurality of driven gears, shiftable into mesh in pairs by relative axial movement; and an engine to actuate the driving gears, and having a throttle; of means acting automatically to cause such relative movement of a pair of gears when the pitch-line velocities thereof have a predetermined ratio, said means including a pair of overlapping spaced disks rotating in the same direction and in harmony with the driving gears and driven gears respectively, a wheel between the disks for rotation thereby and adapted to be shifted thereby axially and transversely, and shifting mechanism actuated by the wheel to produce the aforesaid relative axial movement of one or another pair of gears according to the extent of the axial movement of the wheel; and means connected with the engine throttle for adjustment thereby to determine the extent of the axial movement of the wheel.

13. In a transmission mechanism, the combination with a plurality of driving gears and a plurality of driven gears, shiftable into mesh in pairs by relative axial movement, of a device acting automatically to cause such relative movement of a pair of gears, said means including a pair of axially spaced overlapping disks rotating in the same direction on parallel axes, and rotating at angular speeds varying in predetermined constant ratios to the driving gears and driven gears respectively; a wheel between the disks for rotation thereby, movable axially in one direction or the other according as it is on one side or the other of the axial plane of the disks, and movable at an angle to its axes in one direction or the other depending upon the speed-ratio of the disks; shifting devices for the respective pairs of gears, operable selectively by the aforesaid movement of the wheel at an angle to its axis; means operable at will to determine the position of the wheel between the axes of the disks; and means operable at will to vary the speed ratio of the disks.

14. In a transmission mechanism, the combination with a plurality of driving gears and a plurality of driven gears shiftable into mesh in pairs by relative axial movement; of shifting mechanisms for the respective pairs of gears; an actuating device common to said mechanisms, movable automatically in one direction to select one or another of the shifting mechanisms, and also movable automatically in a direction at an angle to the first to actuate the selected mechanism; and means operable at will to arrest the actuating device at points, in its first-mentioned movement, corresponding to the several pairs of gears.

15. In a transmission mechanism, the combination with a plurality of driving gears and a plurality of driven gears shiftable into mesh in pairs by relative axial movement; of shifting mechanisms for the respective pairs of gears; an actuating device common to said mechanisms, movable to select one or another of the shifting mechanisms, and also movable at an angle to the first-mentioned movement to actuate the selected mechanism; and power-driven means cooperating with the actuating device to shift the same in both said directions.

16. In a transmission mechanism, the combination with a plurality of driving gears and a plurality of driven gears shiftable into mesh in pairs by relative axial movement; of shifting mechanisms for the respective pairs of gears; an actuating device common to said mechanisms, movable to select one or another of the shifting mechanisms, and also movable at an angle to the first-mentioned movement to actuate the selected mechanism; power-driven means cooperating with the actuating device to shift the same in both said directions, and means operable at will to arrest the actuating device at any of a plurality of points, in its first-mentioned movement, corresponding to the respective pairs of gears.

17. In a transmission mechanism, the combination with a pair of gears shiftable into mesh by relative axial movement; a pair of overlapping, parallel, axially spaced disks rotating in harmony with said gears; a shaft between the disks, extending transversely of the axes of the disks; a support for the transverse shaft, permitting movement thereof perpendicular to the plane of the disk-axes; a wheel movable axially on the transverse shaft and engaging the disks for rotation and axial movement thereby; a shifter to produce the aforesaid relative movement of the gears; and means connected with the wheel and operated by the aforesaid perpendicular movement of the transverse shaft, to actuate the shifter when the wheel is at a predetermined position on the transverse shaft.

18. In a transmission mechanism, the combination with a pair of gears shiftable into mesh by relative axial movement; a pair of overlapping, parallel, axially spaced disks rotating in harmony with said gears; a shaft between the disks, extending transversely of the axes of the disks; a support for the transverse shaft, permitting movement thereof perpendicular to the plane of the disk-axes; a wheel movable axially on the transverse shaft and engaging the disks for rotation and axial movement thereby; a shifter to produce the aforesaid relative movement of the gears; means connected with the wheel and operated by the aforesaid perpendicular movement of the transverse shaft, to actuate the shifter when the wheel is at a predetermined position on the transverse shaft; and means operable at will to arrest the axially moving wheel at said predetermined position.

19. In a transmission mechanism, the combination with an engine, a throttle therefor, a throttle-actuating device, a driving gear actuated by the engine, and a gear to be driven by the driving gear, of means acting automatically to shift said gears into mesh when the pitch-line velocities thereof have a predetermined ratio, and controlling means, connected with the throttle-actuating device for adjustment thereby, to control the operation of the shifting means.

20. In a transmission mechanism, the combination with an engine, a throttle therefor, an actuating device for the throttle, a driving gear actuated by the engine, and a gear to be driven by the driving gear, of means acting automatically to shift said gears into mesh, said means having operative and inoperative positions, and controlling means, connected with the throttle-actuating device for adjustment thereby, to shift said automatic means from its inoperative to an operative position.

21. In a transmission mechanism, the combination with an engine, a throttle therefor, a throttle-actuating device, driving gears actuated by the engine, and gears to be driven by the respective driving gears, of means acting automatically to select and shift a pair of said gears into mesh when the pitch-line velocities of the selected pair have a predetermined ratio, and controlling means, connected with the throttle-actuating device for adjustment thereby, to control the operation of the shifting means.

22. In a transmission mechanism, the combination with a plurality of gears shiftable into mesh in pairs by relative axial movement, of a gear-shifting device movable automatically to operative positions corresponding to the respective pairs of gears, and acting automatically at each position to shift the selected pair into mesh when the pitch-line velocities thereof have a predetermined ratio.

23. In a transmission mechanism, the combination with a plurality of gears shiftable into mesh in pairs by relative axial movement, of a gear-shifting device movable automatically to successive operative positions corresponding to the respective pairs of gears, and acting automatically at each position to shift the selected pair into mesh when the pitch-line velocities thereof have a predetermined ratio, and means operable at will to arrest the gear-shifting device at any of its operative positions.

24. In a transmission mechanism, the combination with a plurality of gears shiftable into mesh in pairs by relative axial movement, of a gear-shifting device movable to operative positions corresponding to the respective pairs of gears and movable at each position to shift the selected pair into mesh, power-driven means for moving said gear-shifting device, and means operable at will to control the movements of the gear-shifting device.

25. In a transmission mechanism, the combination with a main shaft; a countershaft; and gears mounted on said shafts and shiftable into mesh by relative axial movement; of means acting automatically to produce said relative axial movement and dependent for operation upon a predetermined speed ratio of said shafts.

26. In a transmission mechanism, the combination with a main shaft; a countershaft and an idler shaft having a constant speed ratio; and gears mounted on the main shaft and countershaft and shiftable into mesh by relative axial movement; of means acting automatically to produce said relative axial movement and dependent for operation upon a predetermined speed-ratio of the main shaft and the countershaft.

27. In a transmission mechanism, the combination with a main shaft; a countershaft and an idler shaft having a constant speed ratio; and gears mounted on the main shaft and countershaft and shiftable into mesh by relative axial movement; of means acting automatically to produce said relative axial movement and dependent for operation upon a predetermined speed ratio between the main shaft and the countershaft; and means operable at will to vary the speed of the countershaft and idler shaft.

28. In a transmission mechanism, the combination with a pair of shafts having gears adapted to be meshed by relative axial movement, of mechanism actuated by the energy of said shafts to produce such relative axial movement and dependent for operation upon a predetermined ratio of the pitch-line velocities of the gears.

29. In a transmission mechanism, the combination with a pair of shafts having gears adapted to be meshed by relative axial movement, of mechanism actuated by the energy of said shafts to produce such relative axial movement and dependent for operation upon a predetermined ratio of the pitch-line velocities of the gears, and means operable at will to vary the speed of one of said shafts.

30. In a transmission mechanism, in combination, means automatically movable to vary the speed of the transmission mechanism, and foot-actuated means for initiating and controlling the movement of said automatic means.

31. In a transmission mechanism, in combination, automatic means for varying the speed of the transmission mechanism, an accelerator pedal, and controlling means for the said automatic means, connected with the accelerator pedal for actuation thereby.

32. In a transmission mechanism, in combination, automatic means for varying the speed of the transmission mechanism, a driving engine associated with the transmission mechanism and having a throttle, a pedal connected with the throttle to actuate the same, and controlling means for the said automatic means, connected with the pedal for actuation thereby.

33. In a transmission mechanism, the combination with a plurality of gears shiftable into mesh in pairs, and an engine adapted to drive a gear of each pair and having a throttle, of a pedal connected with the throttle to actuate the same, automatic mechanism for shifting the gears into mesh in pairs, and controlling means for said automatic mechanism, connected with the pedal for actuation thereby.

34. In a selective sliding-gear transmission mechanism, in combination, an engine connected with the transmission mechanism to drive the same and having a throttle, a pedal for actuating the throttle, automatic means for varying the speed of the transmission mechanism when the gears selected for meshing have a predetermined pitch-line velocity ratio, and means actuated by said pedal for controlling said automatic means.

35. In a transmission mechanism, in combination, a pair of gears shiftable into mesh by relative axial movement, and automatic means to cause such relative axial movement, controlled by the pitch-line velocities of the two gears conjointly.

36. In a selective sliding-gear transmission mechanism, in combination, a plurality of gears shiftable into mesh in pairs by relative axial movement, automatic means to cause such relative axial movement, controlled by the pitch-line velocities of the two gears conjointly, and means operable at will to select the pair of gears to be meshed.

37. In a selective sliding-gear transmission mechanism, in combination, a plurality of gears shiftable into mesh in pairs by relative axial movement, automatic means to cause such relative axial movement, controlled by the pitch-line velocities of the two gears conjointly, and foot-actuated means operable at will to select the pair of gears to be meshed.

38. In a variable-speed transmission mechanism, in combination, automatic means for varying the speed of the transmission mechanism, an engine for driving the transmission mechanism, foot-throttle mechanism for the engine, and means actuated by the foot-throttle mechanism for controlling the said automatic means.

39. In a variable-speed transmission mechanism, in combination, automatic means for varying the speed of the transmission mechanism, an engine for driving the transmission mechanism, a throttle for the engine, controlling mechanism for said automatic means, and a pedal common to the throttle and the controlling mechanism for actuating both.

In testimony whereof I hereto affix my signature.

FRANK A. HAYES.